United States Patent [19]

Eggers

[11] 4,070,070
[45] Jan. 24, 1978

[54] VEHICLE WHEEL SPEED RETARDING SYSTEM

[76] Inventor: Frederick S. Eggers, 3961 Altadena Lane, San Jose, Calif. 95127

[21] Appl. No.: 712,206

[22] Filed: Aug. 6, 1976

[51] Int. Cl.² .............................................. B60T 8/02
[52] U.S. Cl. ..................................... 303/116; 303/117
[58] Field of Search ............. 180/105 R, 108; 60/474; 417/233; 303/98, 116, 117; 188/181 R, 181 C, 290, 293; 137/47, 49, 53, 54, 56

[56] References Cited

U.S. PATENT DOCUMENTS

| | | | |
|---|---|---|---|
| 1,529,886 | 3/1925 | Harrigan | 188/293 |
| 2,179,540 | 11/1939 | Burdick | 188/181 R X |
| 2,364,853 | 12/1944 | Kalin | 137/53 |
| 2,373,138 | 4/1945 | Morith | 188/292 X |
| 2,535,097 | 12/1950 | Seghers | 188/292 X |
| 3,822,770 | 7/1974 | Golan | 137/49 |

Primary Examiner—Kenneth H. Betts
Attorney, Agent, or Firm—Melvin R. Stidham

[57] ABSTRACT

A vehicle wheel speed retarding system comprising a positive displacement fluid pump in a liquid system adapted to be driven by positive engagement with means on the wheel drive. The output of the pump is delivered to a valve and governor means also driven by the vehicle wheel drive operates the valve to reduce its flow capacity with increase in speed, thus retarding the positive displacement pump and, hence, the vehicle wheel. Manually regulated means, such as controlled air pressure acting against a diaphragm, resists movement of the valve to control the speed capacity of the device. Failure of air pressure will result in minimum speed capacity.

5 Claims, 2 Drawing Figures

VEHICLE WHEEL SPEED RETARDING SYSTEM

BACKGROUND OF THE INVENTION

In motor vehicles, and particularly trucks, motor homes and other heavy vehicles, there is a need for some means to retard the speed of the rear wheels, particularly on downgrades, to avoid "jackknifing" without requiring constant brake pressure. Excessive drag on the brake shoes may generate excessive heat and cause brake damage through friction. Others have sought to ease the problem by governing engine speed or applying braking means dependent upon engine speed but it is highly desirable to direct the control to, and limit the speed of, the rear wheels themselves to avoid a tendency of same to overrun the others.

OBJECTS OF THE INVENTION

It is an object of this invention to provide a system which restricts the speed of a motor vehicle's rear wheels to a predetermined limit.

It is a further object of this invention to provide a vehicle rear wheel retarding system which enables the operator to select a speed limit.

It is a further object of this invention to provide a system which applies a preset retardation to the rear wheels of a vehicle.

It is a further object of this invention to provide a vehicle wheel speed retarder which is simple to install and reliable in operation.

Other objects and advantages of this invention will become apparent from the description to follow, particularly when read in conjunction with the accompanying drawings.

SUMMARY OF THE INVENTION

In carrying out this invention I provide a rotary, positive displacement pump which is driven by some positive drive means, such as gearing, directly from the rear wheel drive of a vehicle. The output of the pump is directed to a spool type valve, which moves axially to restrict or increase flow capacity. The valve is operated by a speed-responsive device, such as a centrifugal governor driven by the rear wheel drive, and wherein arms carrying flyweights force the spool toward its closed position with increases in speed. Acting against the other end of the valve spool, and resisting such action of the governor, is an operator-controlled device, such as a diaphragm biased by compressed air at pressures, which are regulated by the vehicle operator. Hence, at higher air pressures, as the driver might select in level driving, a higher wheel speed is required to move the valve spool to closed position. In the event of air pressure failure, a minimum speed range is enabled. Reduction in flow capacity as the valve closes, results in retardation of the positive displacement pump, and because of the positive drive connection with the vehicle wheel, retardation of the pump results in retardation of the wheel speed.

DESCRIPTION OF A PREFERRED EMBODIMENT

Figure 1:
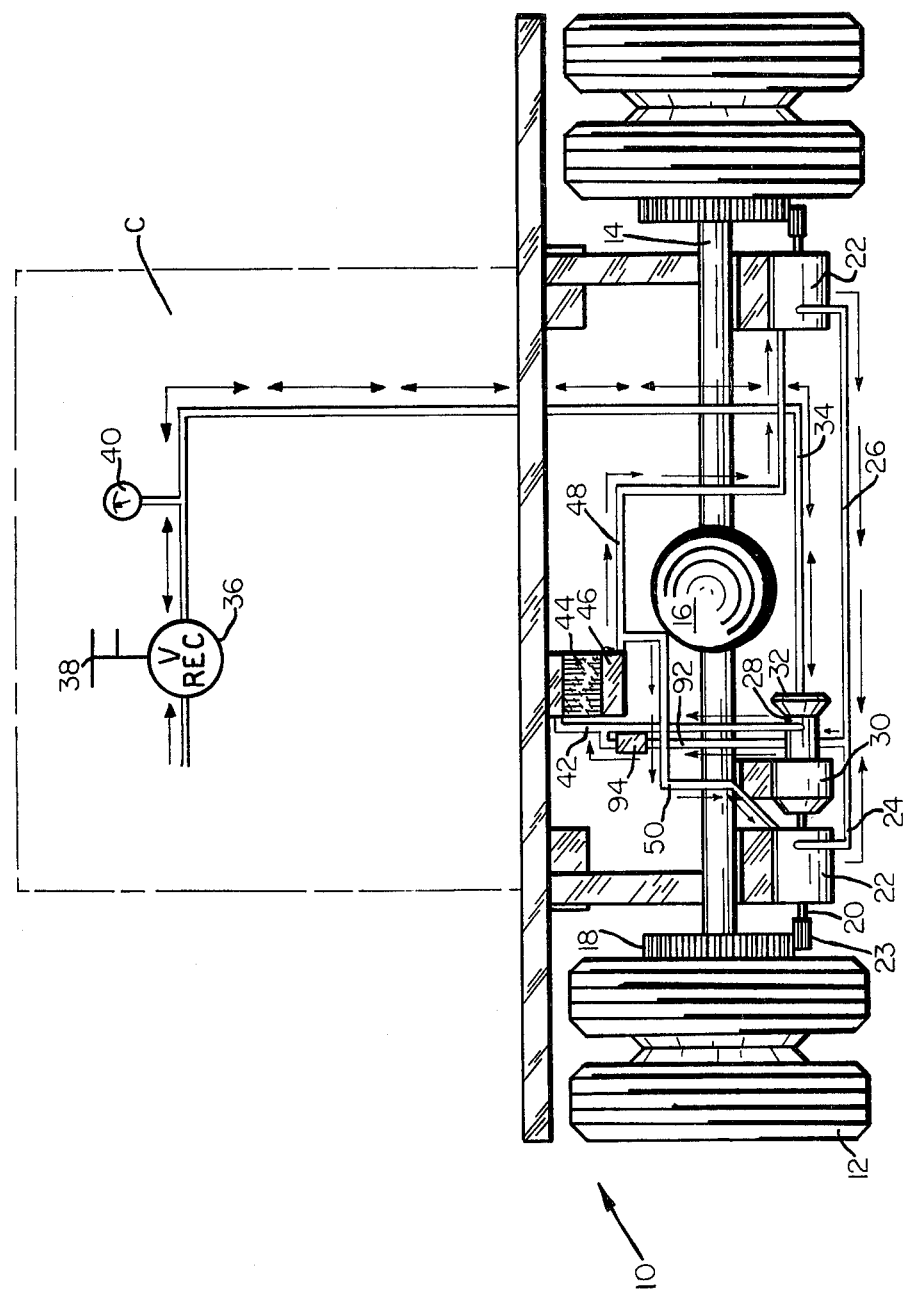
FIG. 1 is a rear view of a truck trailer including the wheel retardation system of this invention shown more or less schematically.

Referring now to FIG. 1 with greater particularity, there is shown a motor vehicle, such as a truck 10 with rear wheels 12 rotatable mounted on an axle 14, which includes a differential gear box 16. With a differential enabling the rear wheels to rotate independently both must be speed-controlled, and accordingly, there is mounted directly on each rear wheel 12 a ring gear 18 to drive the shaft 20 of a positive displacement pump 22 through positive engagement of a pinion 23 thereon. The discharges of both pumps 22 and directed through ducts 24 and 26 to a valve 28, which is operated by a wheel speed controlled device 30, the movements of which are resisted by a manually pre-set device 32 actuated by a suitable medium, such as compressed air as will hereinafter be described.

Air pressure to the diaphragm device is delivered through conduit 34 from a pressure regulator 36, the control mechanism of which 38 is located in the cab C of the truck 10 so that the operator may select a pressure level, as indicated by a suitable gauge 40, in accordance with the level of speed limitation desired. The source of air pressure (not shown) may be the same as used for conventional air brakes.

Referring back to the hydraulic system, a relatively low viscosity fluid is preferred and from the speed control valve 28, it is directed through duct 42 to a heat exchanger 44 and reservoir 46, and from there through suction lines 48 and 50 back to the positive displacement pumps 22.

Figure 2:
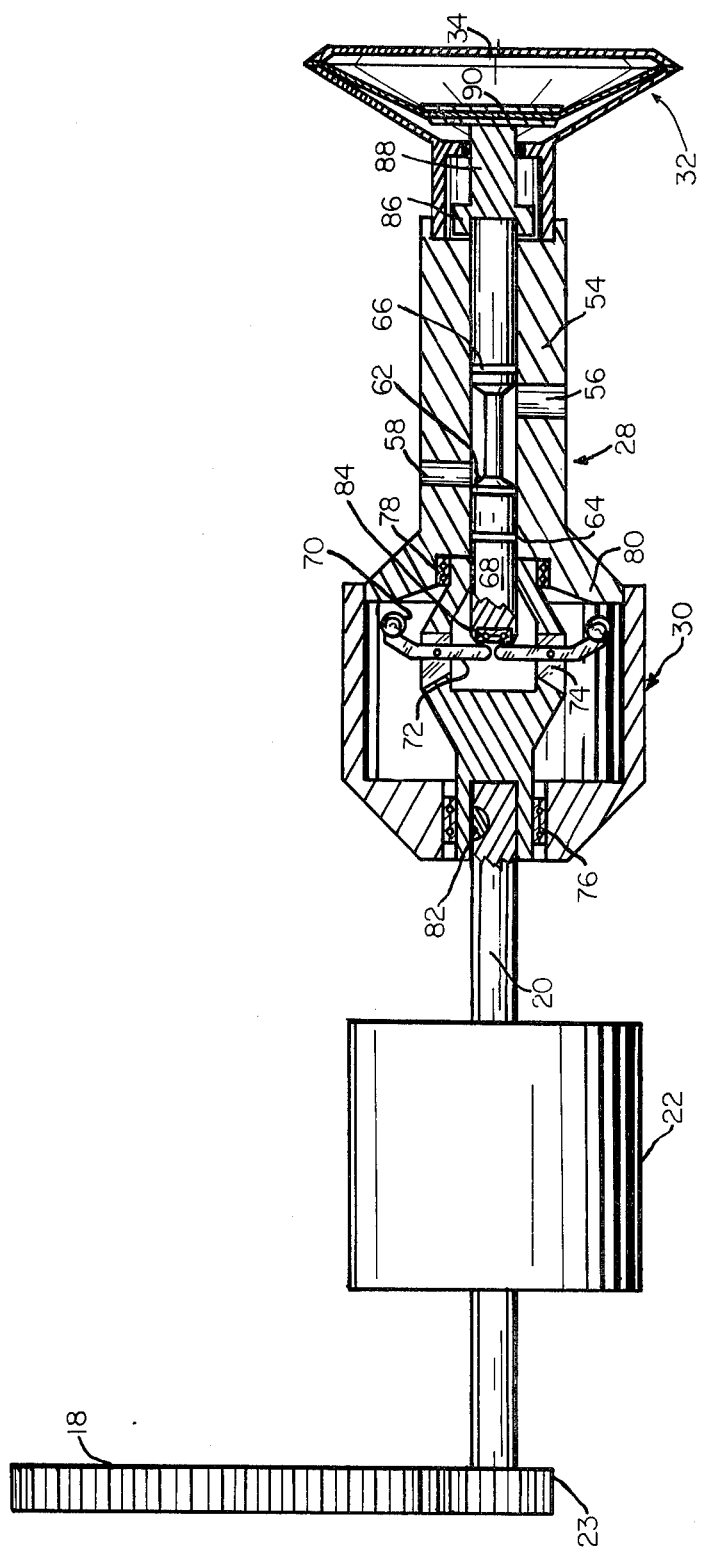
FIG. 2 is a section view of the valve control comprising a principal component of the system.

Referring now to FIG. 2, the valve 28 is illustrated as of the spool type comprising a valve body 54 with inlet and outlet flow passages 56 and 58. In the position shown in FIG. 2, the valve is in the maximum flow capacity with both ports 56 and 58 uncovered. However, as the spool 60 moves toward the right, the outlet passage 58 will gradually be covered by a seal ring 62 to reduce flow capacity accordingly. Additional seal rings 64 and 66 seal against leakage. A left spool extension 68 extends into the speed indicating device 30 which may take the form of a centrifugal governor wherein flyweights 70 are carried on bell crank levers 72 pivoted on a rotor 74 to swing out by centrifugal force in a conventional manner. The rotor is carried in suitable bearings 76 and 78 mounted in the governor housing 80 and is keyed at 82 to be driven by the input shaft 20, which as shown, is the shaft on the positive displacement pump. In any event, it is driven by the vehicle wheel 12 so that the speed of the rotor 74 is directly proportional to the speed of the vehicle wheel 12. The arms of the bell crank levers 72 engage a thrust bearing plate 84, which is rotatably mounted at the end of the spool 60 to push the spool toward closed position as wheel speed throws the flyweights 70 outward. Engaging the other end of the spool 60 is a cup 86 carried on a stem 88, which is secured on and sealed into a diaphragm member 90 sealed across the housing 32. Hence, as pressurized air or other gas is introduced through the line, the diaphragm 90 and stem 88 are forced to the left in FIG. 2, pushing the spool in opposition to the governor device 30 in order to resist the action thereof. Accordingly, at higher air pressures as set by the vehicle operator, a greater range of vehicle speed is enabled before the valve spool 60 moves to a flow restricting position.

In operation, the vehicle driver sets the desired pressure at the pressure regulator 36, 38 in accordance with the speed he wishes to be restricted to without braking, usually dependent upon the grade of the road over which he is driving. In the case of a steep downgrade, he may set the regulator for relatively low speed control, i.e. at a low pressure. In any event, as the speed of the vehicle wheel 12 increases, the flyweights 70 of the centrifugal governor 30 will be thrown outward to force the valve spool 60 toward closed position gradually decreasing the flow capacity of the valve 28. Because the pump 20 is a positive displacement one, this will result in retarding the rotation of the pump and, through the positive connection between gears 18 and 22, retard the rotation of the rear truck wheels 12, as well, slowing the vehicle 10 without skidding, and without undue brake wear. The by-pass duct 92 with relief valve 94 are provided to prevent undue build up of pressure in the system and to avoid lock-up and skidding of the rear wheels 12 should the flow through valve 28 become too restricted.

Because the system is such that higher air pressures enable greater speed, it is apparent that a failure in the air pressure system 34 results in a failsafe effect, wherein the diaphragm 90 offers virtually no resistance to the action of the governor device 30, producing a stall at relatively low speeds.

While this invention has been described in conjunction with a preferred embodiment thereof, it is obvious that modifications and changes may be made therein without departing from the spirit and scope of this invention as defined by the claims appended hereto. For example, while I have shown pumps 22 for both wheels it is obvious that a single pump could be employed by driving it from the vehicle shaft (not shown) or, where no differential gear system 16 is employed, from either wheel.

What is claimed as invention is:

1. A vehicle wheel speed retarder system comprising;
    a positive displacement fluid pump;
    a liquid reservoir-connected to said pump;
    a positive drive means for said pump, with the driving element thereof adapted to be mounted on, and to rotate with, the wheel drive of a vehicle;
    a valve housing having a flow passageway therethrough;
    duct means connecting the output of said pump to said flow passageway;
    a valve member moveable in said housing from a full open through progressively more restrictive positions;
    a speed-responsive device adapted to be driven by said vehicle wheel drive and conditioned to move said valve member through said more restrictive positions in response to increases in vehicle wheel speed; and
    manually adjustable means resisting said movement of the valve member comprising:
    a casing;
    a pressure-responsive member sealed across said casing;
    means on said pressure-responsive member engaging said valve member to bias it towards said open position;
    a source of pressure fluid; and
    conduit means for directing fluid from said source to bias said pressure-responsive member.

2. The wheel speed retarder defined by claim 1 wherein said pressure fluid is a pressurized gas and including;
    a pressure regulator in said conduit means; and
    manually adjustable means for regulating the outlet pressure of said pressure regulator.

3. The wheel speed retarder defined by claim 1 wherein;
    said pressure-responsive member is a diaphragm.

4. The wheel speed retarder defined by claim 1 wherein said speed-responsive device comprises:
    a centrifugal governor adapted to be driven by said vehicle wheel drive; and having
    flyweights on arms pivoted thereon; and
    means on said arms for moving said valve member.

5. The wheel speed retarder defined by claim 1 wherein;
    said valve member is a spool slidable axially in a cylindrical bore.
    said spool being engaged at one end by said weighted arm and at the other end by said pressure-responsive member.

* * * * *